(12) United States Patent
Lee et al.

(10) Patent No.: US 12,090,902 B2
(45) Date of Patent: Sep. 17, 2024

(54) MESH INTEGRATED SEAT PAD ASSEMBLY

(71) Applicants: HYUNDAI MOTOR COMPANY, Seoul (KR); KIA CORPORATION, Seoul (KR); HYUNDAI TRANSYS INC., Seosan-si (KR)

(72) Inventors: Sang-Hark Lee, Incheon (KR); Sang-Do Park, Suwon-si (KR); Deok-Soo Lim, Hwaseong-si (KR); Chan-Ho Jung, Gunpo-si (KR); Sang-Soo Lee, Hwaseong-si (KR); Beom-Sun Kim, Hwaseong-si (KR); Sang-In Woo, Yongin-si (KR); Hyun-Seok Song, Yeosu-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 112 days.

(21) Appl. No.: 17/934,256

(22) Filed: Sep. 22, 2022

(65) Prior Publication Data
US 2023/0158930 A1 May 25, 2023

(30) Foreign Application Priority Data
Nov. 19, 2021 (KR) .......................... 10-2021-0160601

(51) Int. Cl.
*B60N 2/66* (2006.01)
*B60N 2/806* (2018.01)
*B60N 2/90* (2018.01)

(52) U.S. Cl.
CPC .............. *B60N 2/66* (2013.01); *B60N 2/806* (2018.02); *B60N 2/976* (2018.02)

(58) Field of Classification Search
CPC .......... B60N 2/976; B60N 2/66; A61H 9/005; A61H 9/00; A61H 9/0007
See application file for complete search history.

(56) References Cited

U.S. PATENT DOCUMENTS

| | | | |
|---|---|---|---|
| 5,702,159 A | 12/1997 | Matsuoka et al. | |
| 9,333,889 B1 * | 5/2016 | Cloutier | B60N 2/70 |
| 10,220,756 B2 * | 3/2019 | Onuma | A61H 23/04 |
| 2010/0244504 A1 * | 9/2010 | Colja | A61H 9/0078 297/284.6 |

(Continued)

FOREIGN PATENT DOCUMENTS

| | | | | |
|---|---|---|---|---|
| BR | 102013027718 A2 * | 9/2015 | | B60N 2/242 |
| CN | 1847050 A * | 10/2006 | | B60N 2/448 |

(Continued)

*Primary Examiner* — Timothy J Brindley
(74) *Attorney, Agent, or Firm* — MCDONNELL BOEHNEN HULBERT & BERGHOFF LLP

(57) ABSTRACT

A mesh integrated seat pad assembly delivers vibration output from a massage module to the entire seat pad to prevent the vibration from being reduced by the pad. The mesh integrated seat pad assembly includes a pad provided in a seatback supporting the back of a passenger or a seat cushion supporting the hip and the thigh of the passenger to provide additional comfort to the passenger, a mesh mounted on one side surface of the pad, and a massage module installed to be in contact with the mesh.

12 Claims, 9 Drawing Sheets

(56) References Cited

U.S. PATENT DOCUMENTS

| | | | |
|---|---|---|---|
| 2015/0272333 A1* | 10/2015 | Zouzal | A47C 7/467 |
| | | | 297/284.7 |
| 2016/0031351 A1* | 2/2016 | Galbreath | B60N 2/66 |
| | | | 297/284.1 |
| 2022/0040034 A1* | 2/2022 | Son | F16H 37/124 |
| 2023/0000715 A1* | 1/2023 | Rowe | A61H 9/0021 |
| 2023/0191973 A1* | 6/2023 | Migneco | B60N 2/976 |
| | | | 601/148 |
| 2023/0311734 A1* | 10/2023 | Blair | B60N 2/976 |
| | | | 297/284.3 |

FOREIGN PATENT DOCUMENTS

| | | | | |
|---|---|---|---|---|
| CN | 201115550 Y | * | 9/2008 | |
| CN | 203611803 U | * | 5/2014 | |
| CN | 113511122 A | * | 10/2021 | |
| CN | 115179827 A | * | 10/2022 | |
| CN | 115352359 A | * | 11/2022 | |
| CN | 116534067 A | * | 8/2023 | |
| CN | 219630080 U | * | 9/2023 | |
| DE | 102015216945 A1 | * | 3/2017 | ............ B60N 2/914 |
| DE | 102020104308 A1 | * | 8/2021 | ............ A61H 23/02 |
| EP | 3543124 A1 | * | 9/2019 | ............... B60N 2/56 |
| JP | 2004298206 A | * | 10/2004 | |
| JP | 2008-113796 A | | 5/2008 | |
| KR | 20030016692 A | * | 3/2003 | |
| KR | 20080057569 A | * | 6/2008 | |
| KR | 2010-0027420 A | | 3/2010 | |
| KR | 10-1347643 B1 | | 1/2014 | |
| KR | 2015-0071137 A | | 6/2015 | |
| KR | 2016-0062237 A | | 6/2016 | |
| KR | 2016-0125216 A | | 10/2016 | |

\* cited by examiner

MESH INTEGRATED SEAT PAD ASSEMBLY

CROSS REFERENCE TO RELATED APPLICATIONS

This application claims priority to Korean Patent Application No. 10-2021-0160601, filed on Nov. 19, 2021, which is incorporated herein by reference in its entirety.

BACKGROUND

Field of the Disclosure

The present disclosure relates to a seat pad mounted on a seat of a vehicle, and more specifically, to a mesh integrated seat pad assembly, which delivers vibration output from a massage module to the entire seat pad to prevent the vibration from being reduced by the pad.

Description of Related Art

A seat of a vehicle is manufactured by covering a seat pad made of a cushion material with a seat cover made of a fabric or leather material so that a passenger may feel comfortable and mounting the seat pad on a frame.

A function beyond comfort is given to this seat of the vehicle. For example, a massage function is given to the seat.

To give the massage function to a seat 100, as shown in FIGS. 1 to 3, an air cell 125 operated by pneumatic pressure is mounted on a seatback 111 or a seat cushion 112 and the air cell 125 repeatedly performs contraction and expansion, thereby implementing the massage function. However, since the air cell 125 repeatedly performs contraction and expansion, an operating speed is not fast and therefore, a sufficient massage effect may not be obtained. As shown in FIGS. 2 and 3, the vibration generated by the contraction and expansion of the air cell 125 is delivered to a passenger P.

Meanwhile, as another method for giving the massage function to the seat 100, a percussion type massage module is mounted so that the vibration generated by the operation of the massage module is delivered to the passenger P. However, since the pad 121 absorbs the vibration, the vibration generated by the operation of the percussion type massage module is not delivered to the passenger and is absorbed by the pad 121, thereby not exerting a sufficient massage function. In addition, the pad 121 is deformed and worn by the continuous operation of the percussion type massage module.

The contents described in Description of Related Art are to help the understanding of the background of the present disclosure, and may include what is not previously known to those skilled in the art to which the present disclosure pertains.

SUMMARY

The present disclosure is invented to solve the above problem, and an object of the present disclosure is to provide a mesh integrated seat pad assembly, which allows vibration of a percussion type massage module to be efficiently delivered to a passenger from a seat of a vehicle to which the percussion type massage module is applied.

A mesh integrated seat pad assembly for achieving the object includes a pad provided in a seatback supporting the back of a passenger or a seat cushion supporting the hip and the thigh of the passenger to provide additional comfort to the passenger, a mesh mounted on one side surface of the pad, and a massage module installed to be in contact with the mesh.

The pad is made of a porous foam, and the mesh is inserted into the pad.

An accommodating part capable of accommodating the mesh and the massage module is formed in the pad.

The accommodating part is formed concavely from a rear surface of the pad toward a front surface thereof.

The mesh is arranged on an innermost portion of the accommodating part.

The massage module includes an actuator generating vibration when an electric power is supplied, and a plate connected to the actuator and being in contact with the mesh.

The mesh has metal wires formed to be orthogonal to each other while arranged at intervals.

The accommodating part is formed on a portion of the pad mounted on the seatback where the lumbar spine of the passenger is positioned.

The accommodating part is formed on a portion of the pad mounted on the seatback where the shoulder of the passenger is positioned.

The accommodating part is formed on a portion of the pad mounted on the seat cushion where the hip or the thigh of the passenger is positioned.

The accommodating part is formed on the pad mounted in a headrest installed on an upper end of the seatback.

The accommodating part is formed on the pad mounted in a leg rest installed on a front end of the seat cushion to support the lower leg of the passenger.

According to the mesh integrated seat pad assembly according to the present disclosure having the above configuration, since the vibration generated by the massage module is delivered to the entire region of the mesh and then delivered to the pad, the loss of the vibration is reduced compared to the case where the vibration is directly delivered to the pad.

Since the vibration generated by the massage module is sufficiently delivered to the passenger as the loss of the vibration is reduced, the passenger may enjoy the massage effect.

In addition, it is possible to reduce the phenomenon in which the pad is damaged or worn by the massage module.

DETAILED DESCRIPTION

Figure 1:
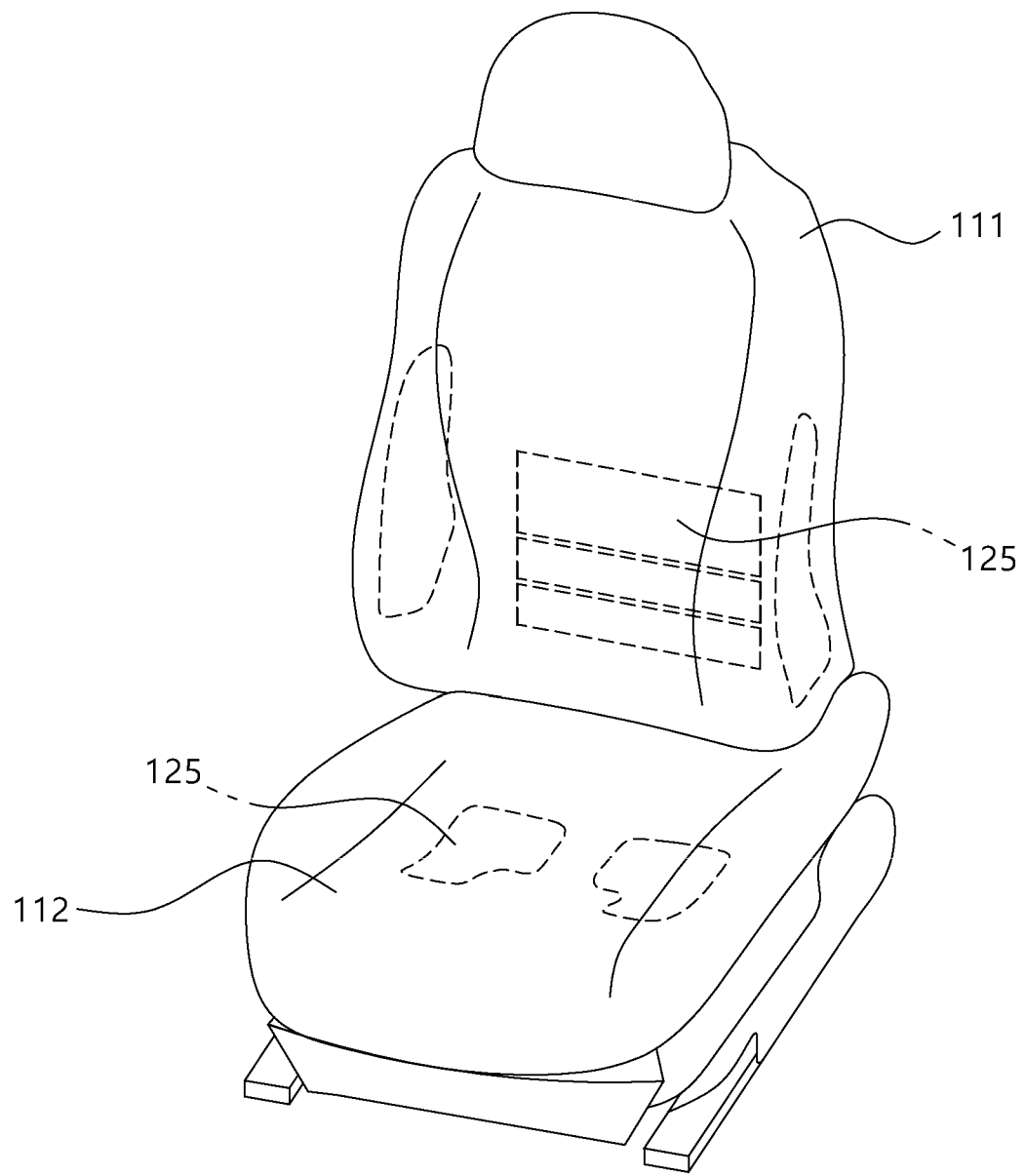
FIG. 1 is a perspective view showing a seat of a vehicle having a massage function according to the related art.
Figure 2:
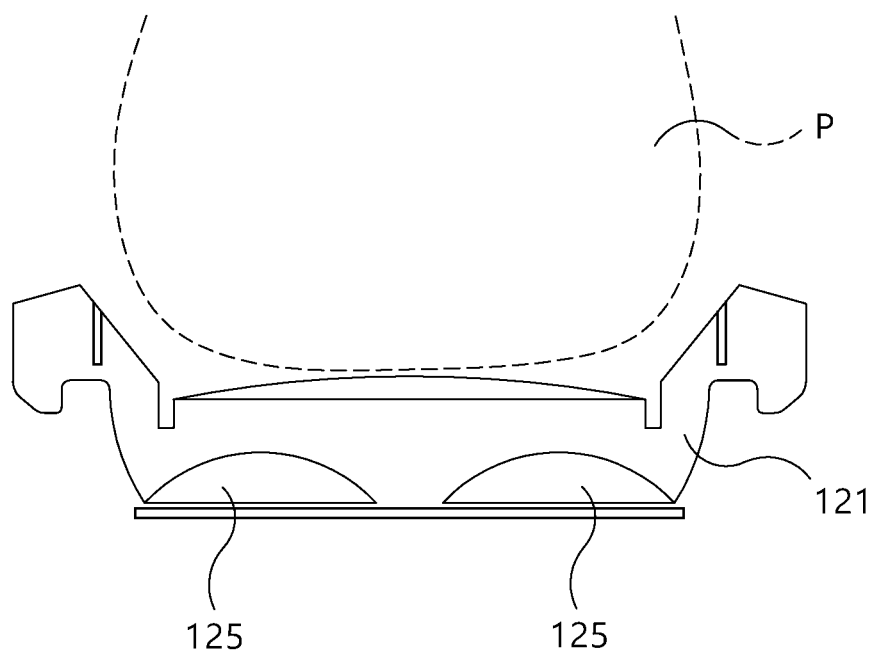
FIG. 2 is a schematic view showing a state where a passenger is seated on a seat cushion of the seat of the vehicle according to the related art.
Figure 3:
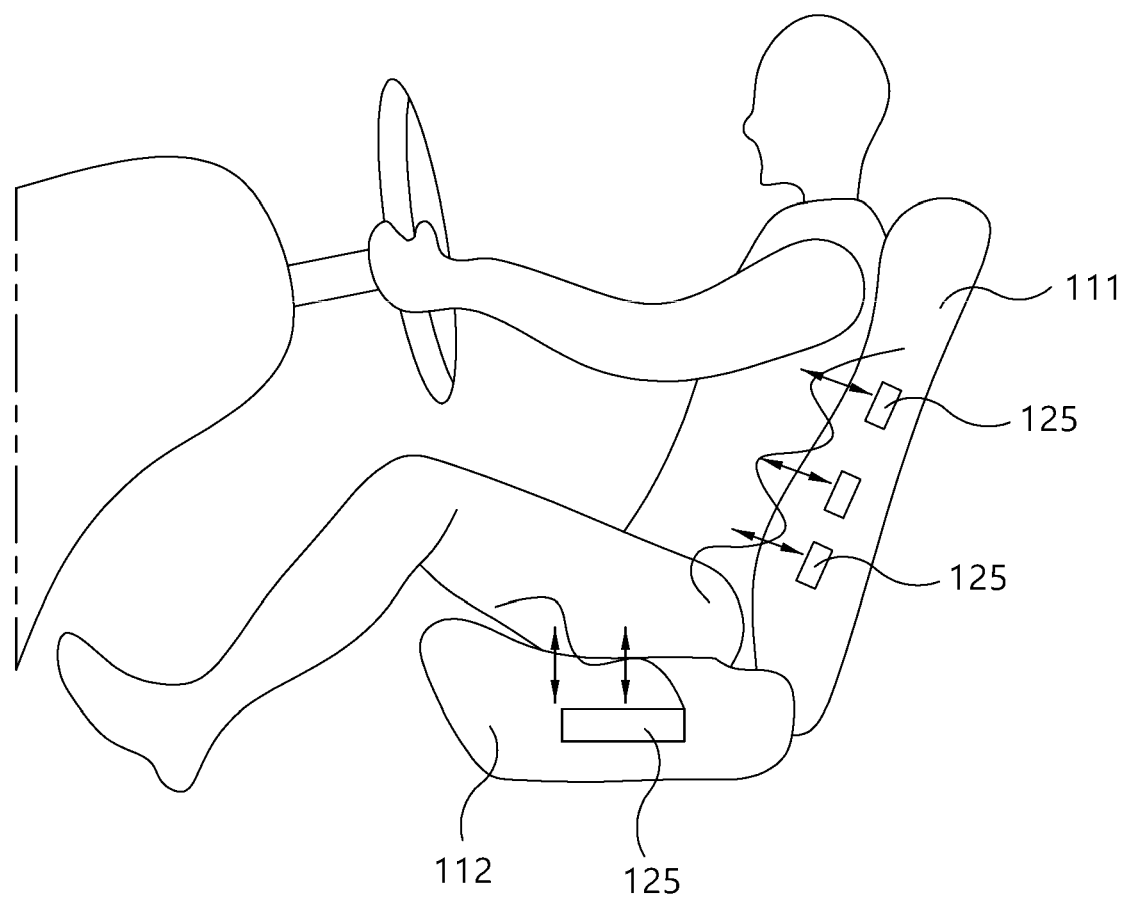
FIG. 3 is a schematic view showing a state where vibration is delivered to the seat of the vehicle according to the related art.
Figure 4:
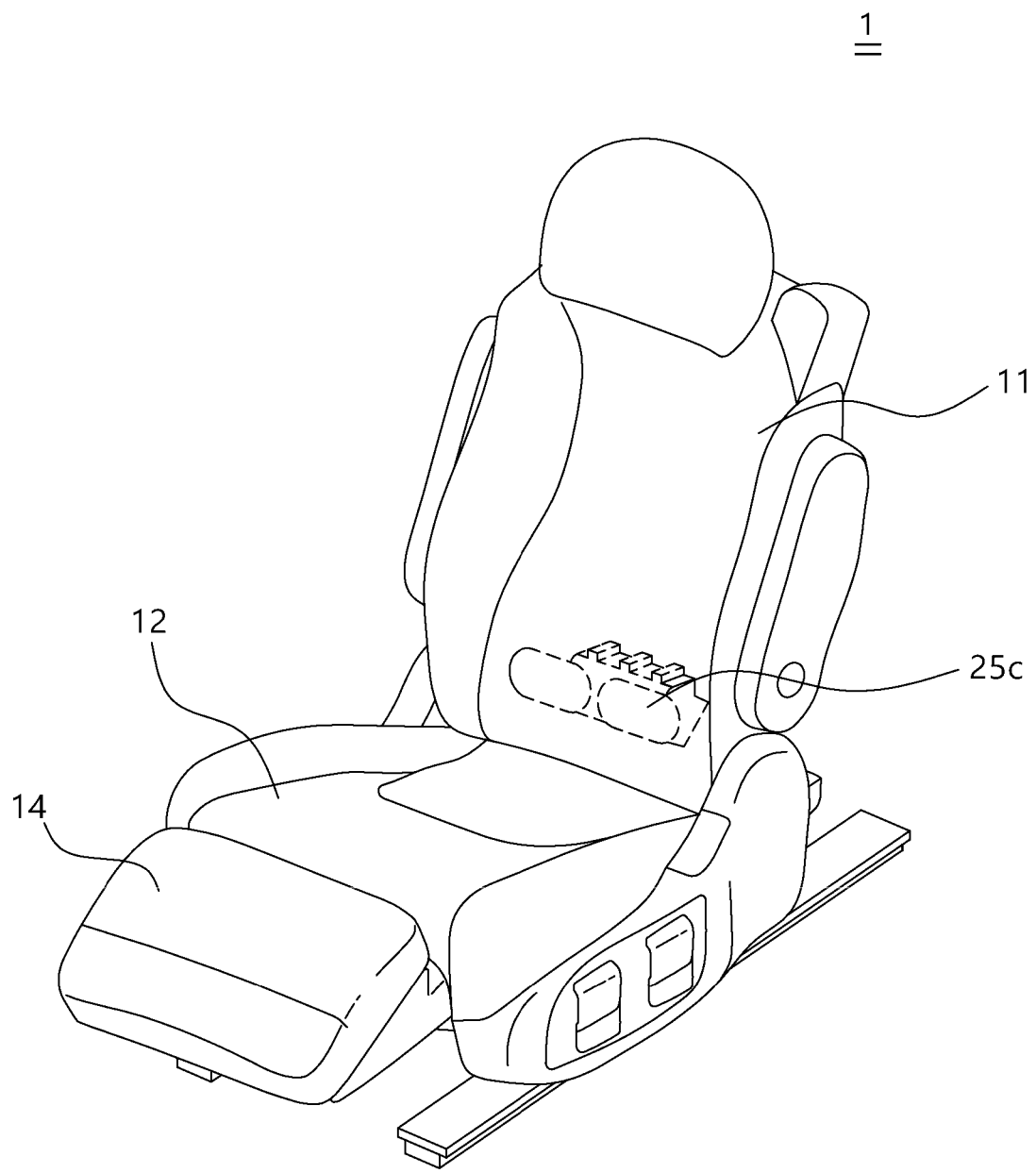
FIG. 4 is a perspective view showing the seat of the vehicle to which a mesh integrated seat pad assembly according to the present disclosure is applied.
Figure 5:
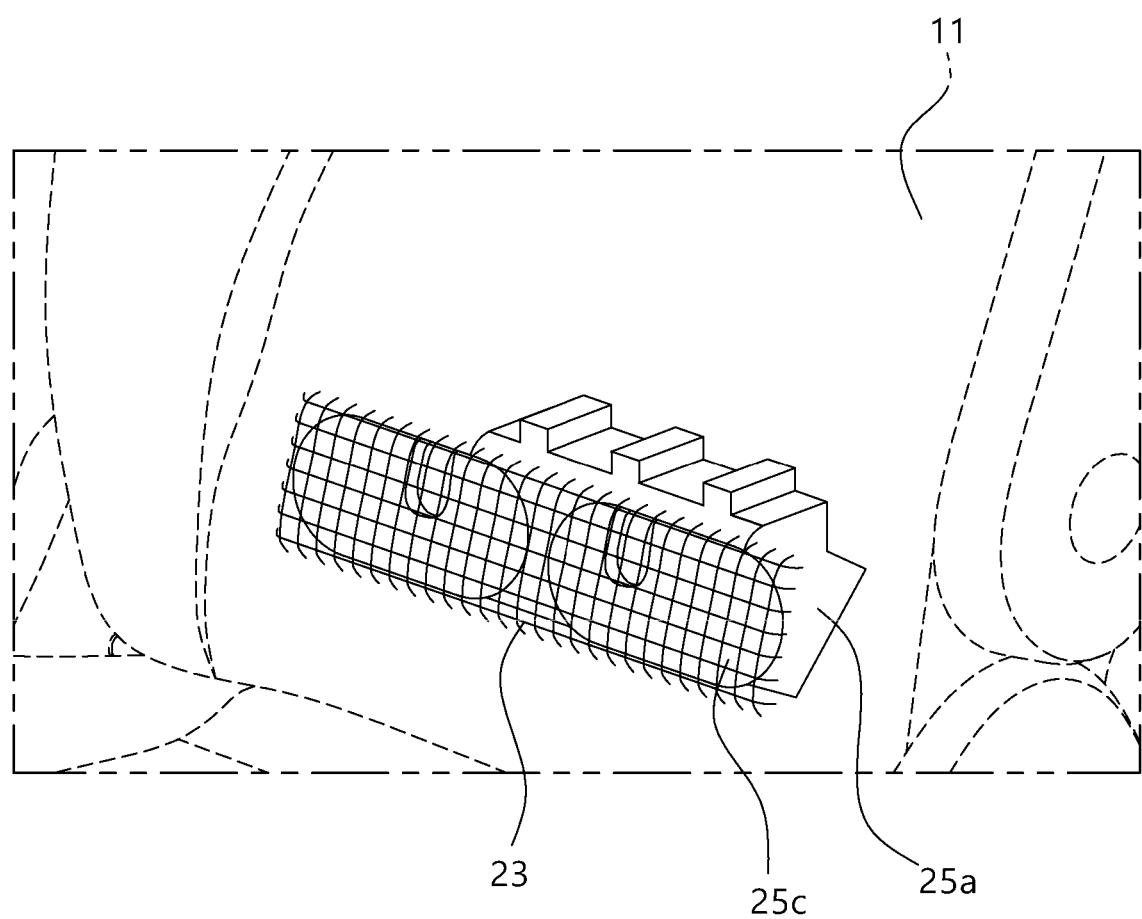
FIG. 5 is an enlarged view of the main part of FIG. 1.
Figure 6:
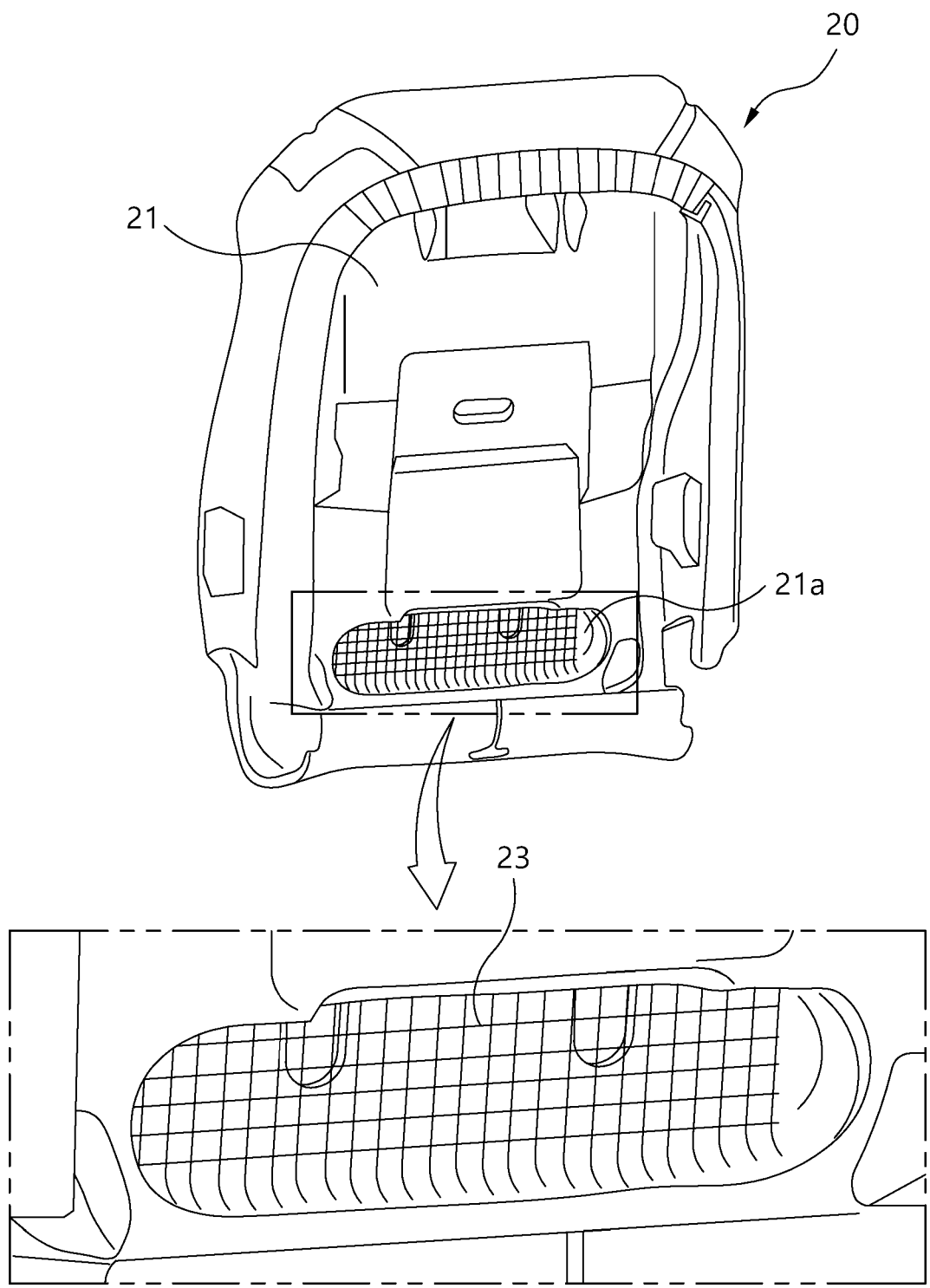
FIG. 6 is a perspective view showing a rear surface of the mesh integrated seat pad assembly according to the present disclosure.
Figure 7:
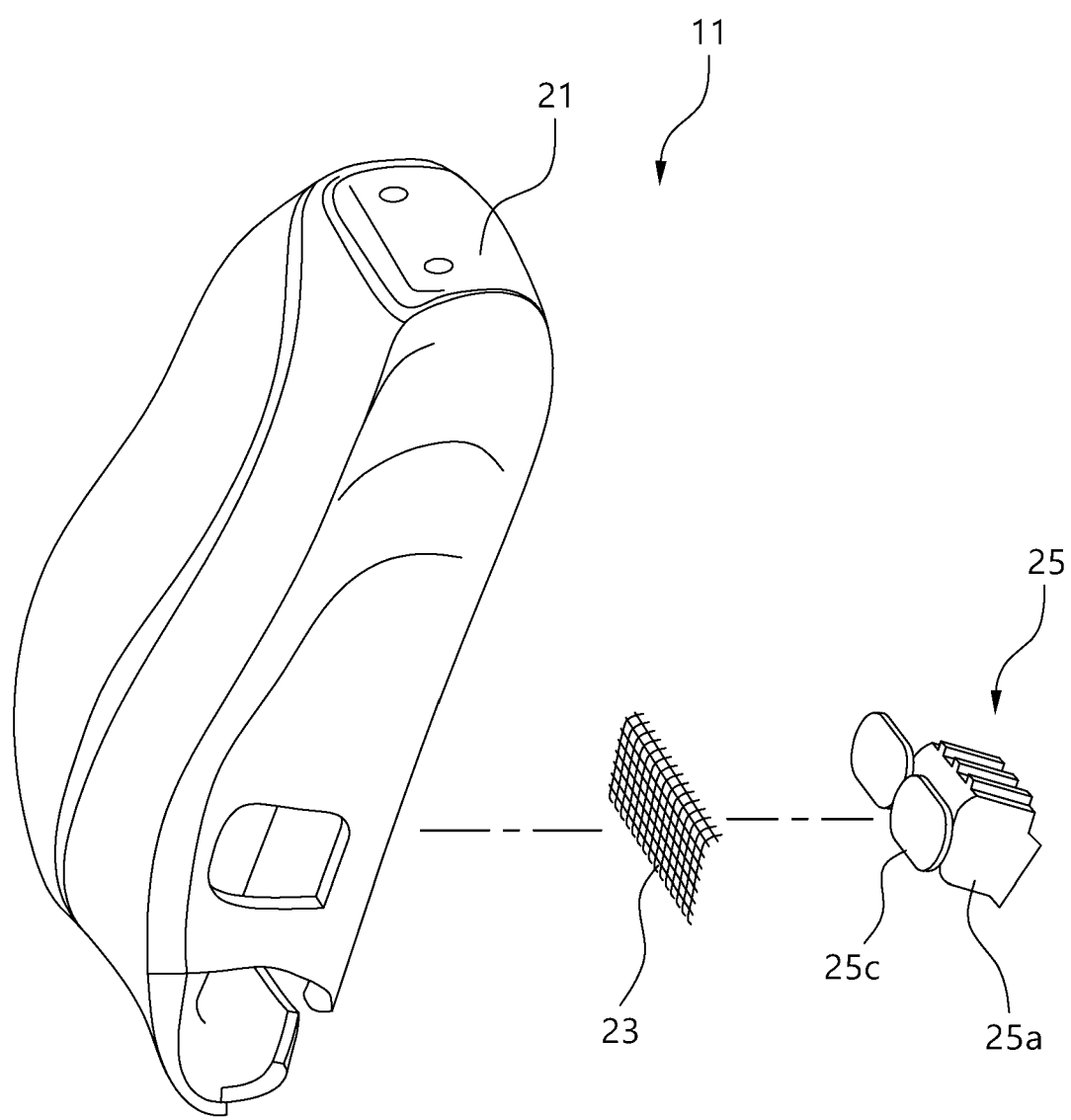
FIG. 7 is an exploded perspective view showing the arrangement relationship of a mesh and a massage module in the mesh integrated seat pad assembly according to the present disclosure.

Hereinafter, a mesh integrated seat pad assembly according to the present disclosure will be described in detail with reference to the accompanying drawings.

Referring to FIGS. 4-9, a mesh integrated seat pad assembly according to the present disclosure includes a pad 21 provided in a seatback 11 supporting the back of a passenger P or a seat cushion 12 supporting the hip and the thigh of the passenger P to provide a cushioning feel to the passenger P, a mesh 23 mounted on one side surface of the pad 21, and a massage module 25 installed to be in contact with the mesh 23.

A seat 1 of a vehicle includes the seatback 11 supporting the back of the passenger P and the seat cushion 12 supporting the hip and the thigh of the passenger P.

The seatback 11 and the seat cushion 12 include a frame, the pad 21 providing the cushioning feel, and a cover 22 (shown in FIG. 8) covering the frame and the pad 21.

The pad 21 is made of foam manufactured by a foam processing to provide the cushioning feel.

The massage module 25 providing vibration for massage to the passenger P is installed on the pad 21. To install the massage module 25, an accommodating part 21a is formed on the pad 21 from the rear surface of the pad 21 toward a bottom surface thereof. A space formed by the accommodating part 21a becomes a space in which the massage module 25 is mounted.

The massage module 25 includes a housing 25a fixed to the frame, an actuator 25b mounted in the housing 25a to generate vibration, and a plate 25c delivering the vibration of the actuator 25b toward the seat 1.

Meanwhile, since the pad 21 is made of the foam manufactured by the foaming, the vibration delivered through the plate 25c may be absorbed by the pad 21, and therefore, the mesh 23 is inserted into the accommodating part 21a so that the vibration of the massage module 25 is reduced less.

When the plate 25c is in direct contact with the pad 21, the contact portion is narrow and the vibration is delivered from this portion and simultaneously damped, and therefore, it is difficult to obtain the massage effect.

To prevent this problem, the mesh 23 made of a metal wire is mounted on the accommodating part 21a so that the plate 25c is in contact with the mesh 23. Since the plate 25c is primarily in contact with the mesh 23, the vibration generated by the actuator 25b is delivered to the entire region of the mesh 23 and simultaneously delivered to the pad 21. As the vibration of the actuator 25b is delivered to a wide region through the mesh 23, the loss of the vibration caused by the pad 21 is reduced compared to the case where the plate 25c is in direct contact with the pad 21.

The mesh 23 has the wires, preferably, the metal wires formed to be orthogonal to each other in a state of being arranged at intervals.

A method for mounting the mesh 23 on the pad 21 mounts the mesh 23 on the pad 21 by foam-molding the pad 21 in a state where the mesh 23 is inserted.

The mesh 23 is mounted on the innermost portion of the accommodating part 21a. Since the accommodating part 21a is formed from the rear surface of the pad 21 toward the front thereof, the mesh 23 is mounted on the side of the accommodating part 21a closest to the passenger P.

Figure 8:
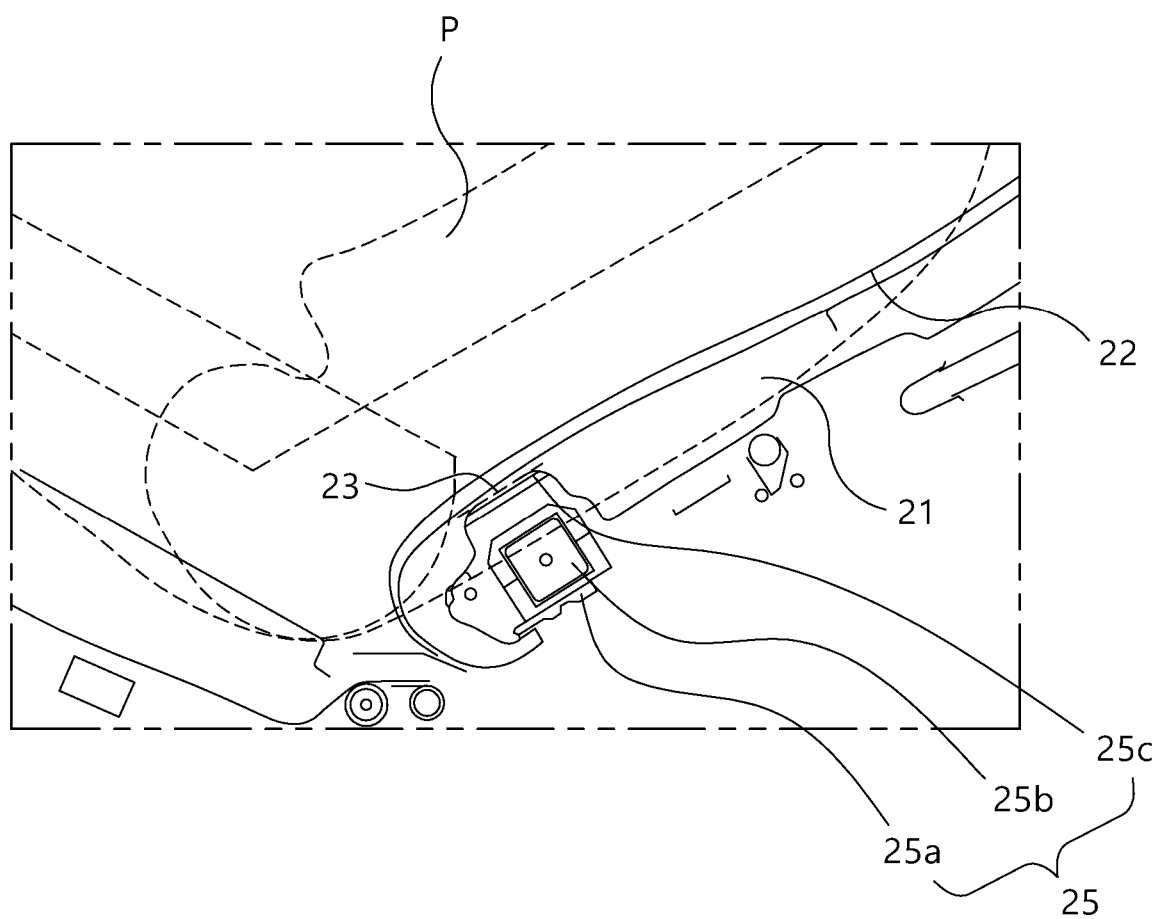
FIG. 8 is a cross-sectional view showing a state where the passenger is seated on the mesh integrated seat pad assembly according to the present disclosure.
Figure 9:
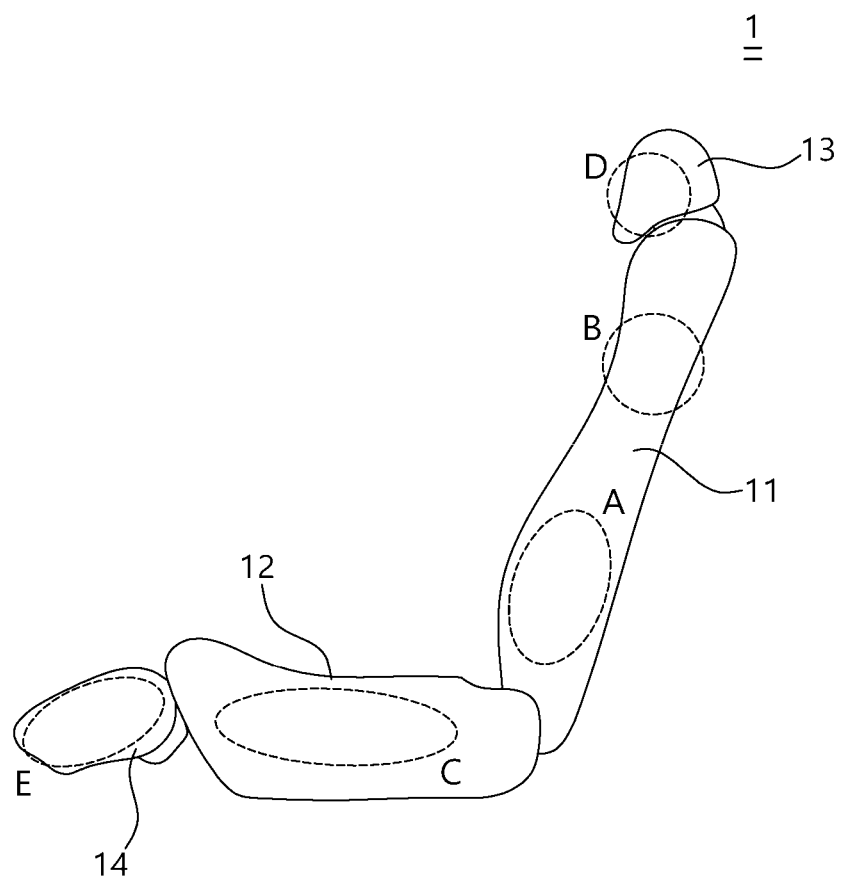
FIG. 9 is a side view showing a portion where the mesh and the massage module are installed in the mesh integrated seat pad assembly according to the present disclosure.

FIG. 8 shows a cross section of a state where the passenger is seated on the seat 1 to which the mesh integrated seat pad assembly according to the present disclosure is applied.

Since the mesh 23 is positioned on the innermost portion of the accommodating part 21a and positioned on the portion close to the passenger P, the vibration generated by the actuator 25b is delivered to the passenger P in a state where the loss caused by the pad 21 is minimized.

The massage module 25 is mounted to give vibration for massage to each portion of the body of the passenger P seated on the seat 1.

The massage module 25 may be installed to apply vibration from the seatback 11 to the lumbar spine or shoulder of the passenger P and installed to apply the vibration from the seat cushion 12 to the hip and the thigh of the passenger P. In addition, the massage module 25 may be installed on an upper end of the seatback 11 and installed on a headrest 13 supporting the head of the passenger P, or installed on a front end of the seat cushion 12 and installed on a leg rest 14 supporting the lower leg of the passenger P.

For example, to apply vibration to the lumbar spine of the passenger in the seatback 11, the accommodating part 21a is formed in the portion of the pad 21 mounted on the seatback 11 where the lumbar spine of the passenger P is positioned (portion indicated by A in FIG. 9), and the mesh 23 and the massage module 25 are arranged in the accommodating part 21a.

To apply vibration for massage to the shoulder of the passenger in the seatback 11, the accommodating part 21a is formed in a portion of the pad 21 mounted on the seatback 11 where the shoulder of the passenger P is positioned (portion indicated by B in FIG. 9), and the mesh 23 and the massage module 25 are arranged in the accommodating part 21a.

In addition, to apply vibration for massage to the hip and the thigh of the passenger P in the seat cushion 12, the accommodating part 21a is formed in a portion of the pad 21 mounted on the seat cushion 12 where the hip and the thigh of the passenger P are positioned (portion indicated by C in FIG. 9), and the mesh 23 and the massage module 25 are arranged in the accommodating part 21a.

In addition, to install the massage module 25 on the headrest 13 installed on the upper end of the seatback 11 to support the head of the passenger P, the accommodating part 21a is formed on the pad 21 mounted on the headrest 13 (portion indicated by D in FIG. 9), and the mesh 23 and the massage module 25 are arranged in the accommodating part 21a.

Meanwhile, to install the massage module 25 on the leg rest 14 installed on the front end of the seat cushion 12 to support the lower leg of the passenger P, the accommodating part 21a is formed in the pad 21 provided in the leg rest 14 (portion indicated by E in FIG. 9), and the mesh 23 and the massage module 25 are arranged in the accommodating part 21a.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A mesh integrated seat pad assembly comprising:
a pad positioned in a seatback supporting the back of a passenger, or in a seat cushion supporting a hip and a thigh of the passenger, wherein the pad is configured to provide additional comfort to the passenger;
a mesh mounted on one side surface of the pad; and
a massage module in contact with the mesh;
wherein the pad further includes an accommodating part for accommodating the mesh and the massage module; and
wherein the accommodating part is formed concavely from a rear surface of the pad toward a front surface thereof.

2. The mesh integrated seat pad assembly of claim 1, wherein the pad is made of a porous foam, and the mesh is inserted into the pad.

3. The mesh integrated seat pad assembly of claim 1, wherein the mesh is arranged on an innermost portion of the accommodating part.

4. The mesh integrated seat pad assembly of claim 1, wherein the massage module comprises:
an actuator generating vibration when an electric power is supplied; and
a plate connected to the actuator and being in contact with the mesh.

5. The mesh integrated seat pad assembly of claim 1, wherein the accommodating part is formed on a portion of the pad mounted on the seatback where a lumbar spine of the passenger is positioned.

6. The mesh integrated seat pad assembly of claim 1, wherein the accommodating part is formed on a portion of the pad mounted on the seatback where a shoulder of the passenger is positioned.

7. The mesh integrated seat pad assembly of claim 1, wherein the accommodating part is formed on a portion of the pad mounted on the seat cushion where the hip or the thigh of the passenger is positioned.

8. The mesh integrated seat pad assembly of claim 1, wherein the accommodating part is formed on the pad mounted in a headrest installed on an upper end of the seatback.

9. The mesh integrated seat pad assembly of claim 1, wherein the accommodating part is formed on the pad mounted in a leg rest installed on a front end of the seat cushion to support a lower leg of the passenger.

10. A mesh integrated seat pad assembly comprising:
a pad positioned in a seatback supporting the back of a passenger, or in a seat cushion supporting a hip and a thigh of the passenger, wherein the pad is configured to provide additional comfort to the passenger;
a mesh mounted on one side surface of the pad; and
a massage module in contact with the mesh;
wherein the mesh has metal wires formed orthogonal to each other while arranged at intervals.

11. The mesh integrated seat pad assembly of claim 10, wherein the pad is made of a porous foam, and the mesh is inserted into the pad.

12. The mesh integrated seat pad assembly of claim 10, wherein the massage module comprises:
an actuator generating vibration when an electric power is supplied; and
a plate connected to the actuator and being in contact with the mesh.

* * * * *